W. S. HARLEY.
LUBRICATOR SYSTEM.
APPLICATION FILED JUNE 14, 1910.
979,484.
Patented Dec. 27, 1910.
3 SHEETS—SHEET 1.
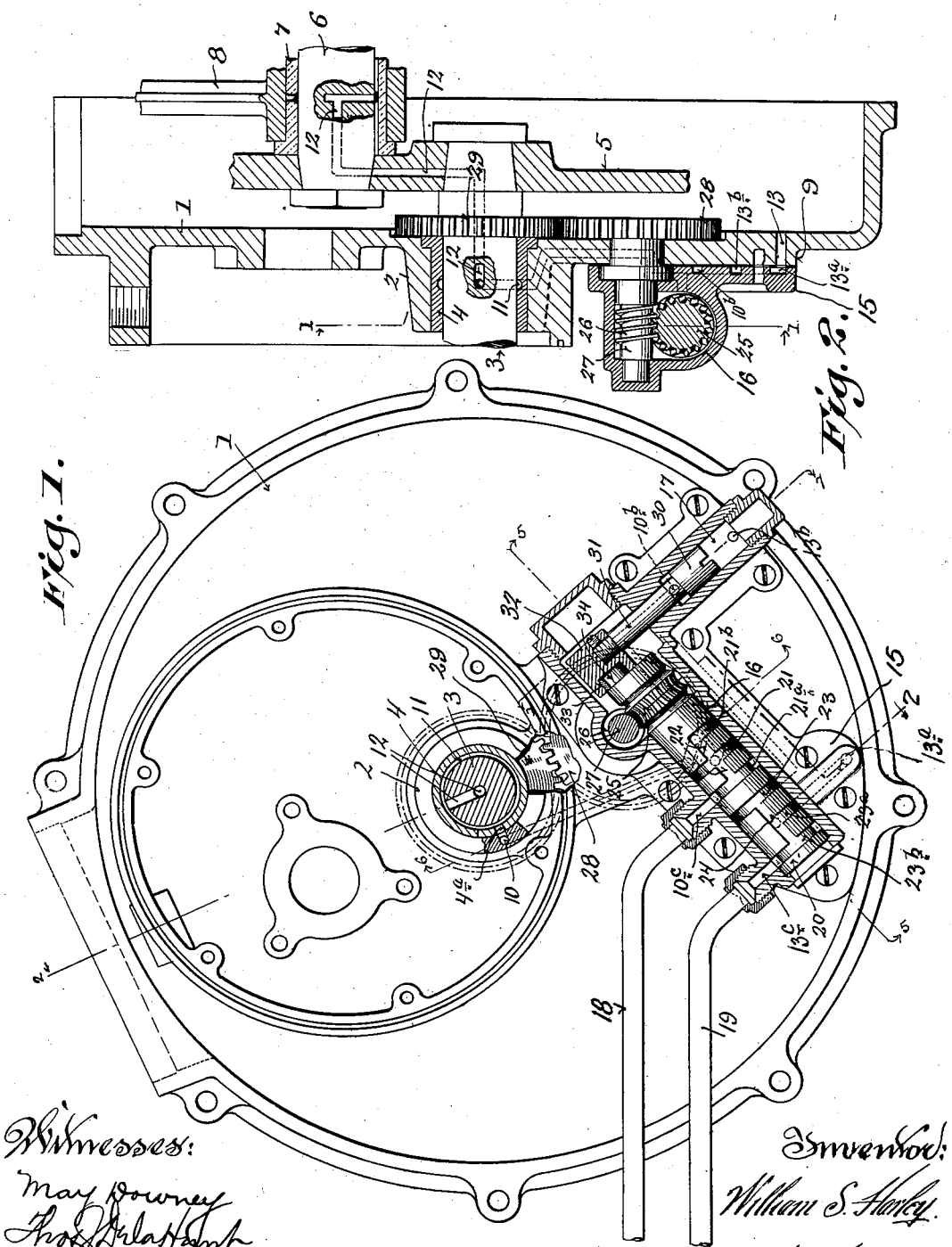

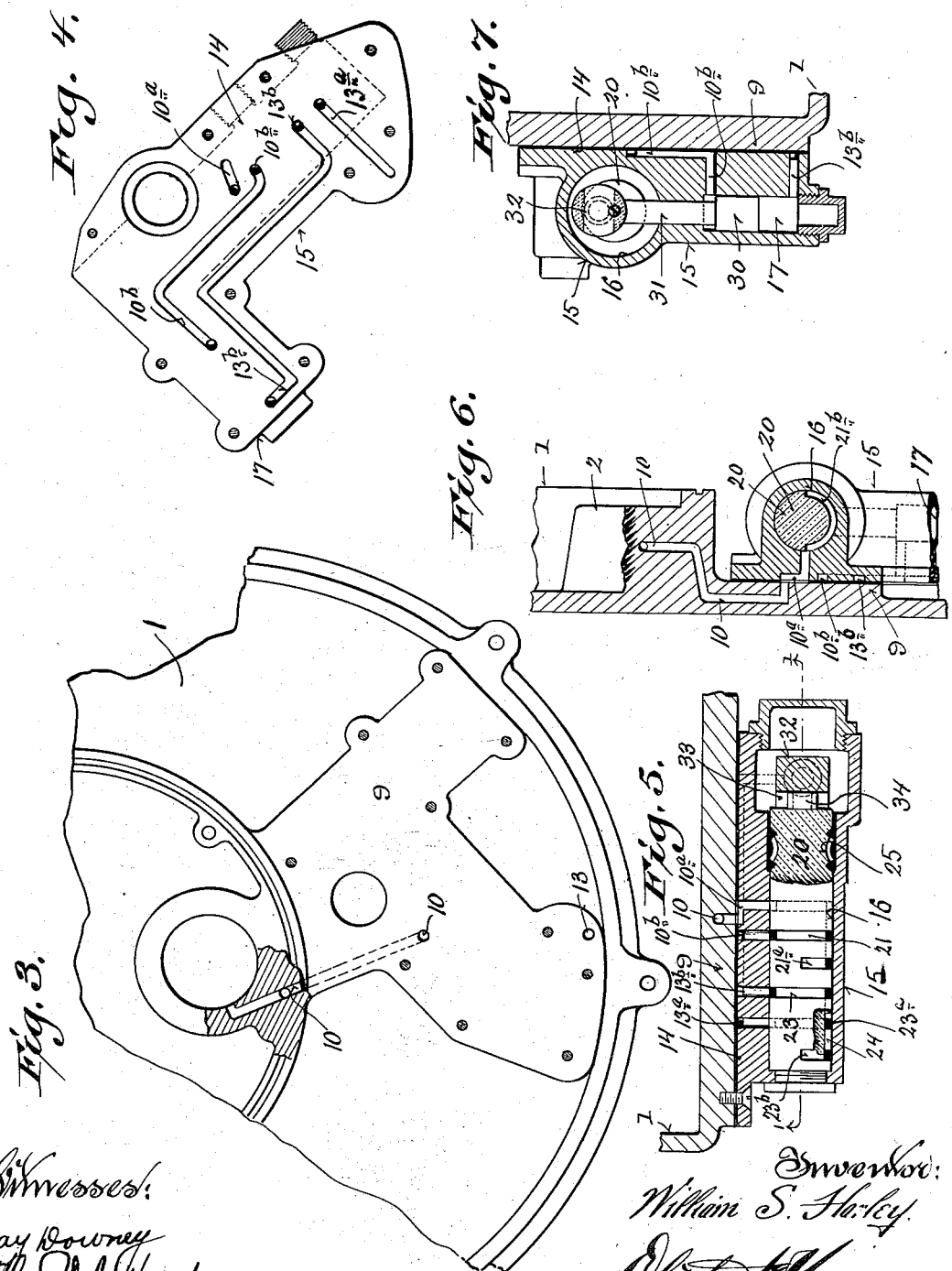

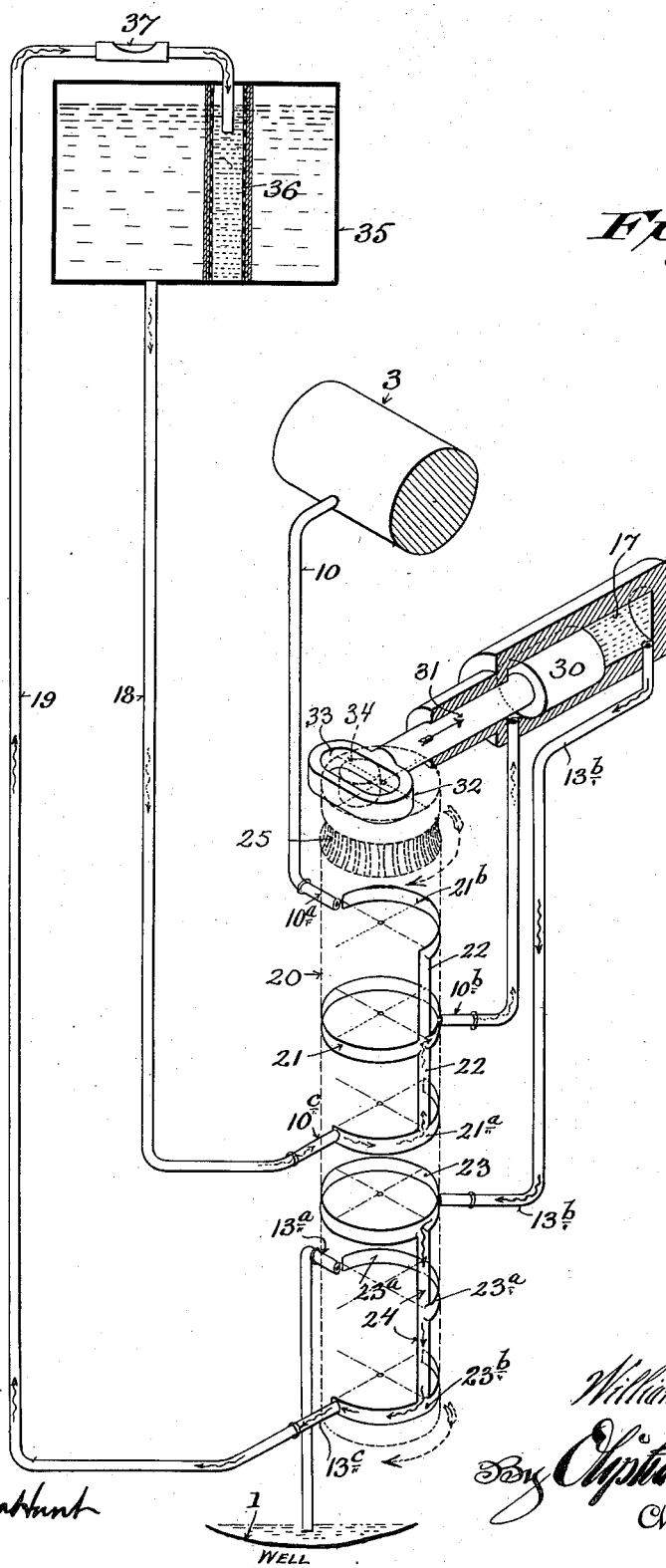

UNITED STATES PATENT OFFICE.

WILLIAM S. HARLEY, OF MILWAUKEE, WISCONSIN.

LUBRICATOR SYSTEM.

979,484.

Specification of Letters Patent.   Patented Dec. 27, 1910.

Application filed June 14, 1910.   Serial No. 566,787.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Lubricator Systems; and I do hereby declare that the following is a full, clear, and exact description thereof.

The object of my invention is to provide a simple, economical and efficient lubricator system especially designed to be applied to self propelled vehicles, the construction and arrangement of the system being such that a rotary valve, operating in unison with a double acting pump, successively places the pump in communication with separate sets of ducts, whereby all check valves are dispensed with and clean oil is distributed to the various journals of an incased mechanism and the surplus oil so distributed is returned to the oil reservoir through a suitable filter, from which reservoir it is circulated throughout the system.

With the above objects in view the invention consists in certain peculiarities of construction and combination of parts to be fully set forth with reference to the accompanying drawings and subsequently claimed.

In the drawings Figure 1 represents a longitudinal sectional view of an oil pump embodying the features of my invention, and attached to the crank casing of an engine of that type used in connection with motorcycles, the section being indicated by line 1—1 of Figs. 2 and 5; Fig. 2, a cross-section of the same indicated by line 2—2 in Fig. 1; Fig. 3, a fragmentary face view of the crank casing, illustrating the raised seat or pump housing seat and communicating oil ducts; Fig. 4, an inverted view of the pump housing, illustrating various oil channels which are adapted to register with the oil ducts of the crank casing seat; Fig. 5, a longitudinal sectional view of a pump as indicated by line 5—5 of Fig. 1; Fig. 6, a detail cross-section of the pump and crank casing as indicated by line 6—6 of Fig. 1; Fig. 7, a detail sectional view of the pump as indicated by line 7—7 of Fig. 1, and Fig. 8, a view in diagram of the entire lubricator system.

Referring by characters to the drawings, 1 represents one member of a motor crank casing having a centrally disposed bearing-boss 2 for a crank-shaft 3, there being a metallic bushing 4 interposed between the shaft and bearing-boss. The crank for crank-shaft 3 is composed of a pair of disks 5 secured to stud portions of the crank-shaft, only one of which is shown, the disks being adapted to rotate within the crank casing. These disks are connected by the usual crank pin 6, which is also provided with a bushing 7, upon which is mounted a pitman 8. The exterior face of the crank casing is provided with a raised seat 9 and from this seat the mouth of an oil duct 10 communicates with the inner annular face of the bearing-boss 2. The bushing 4 is provided with an aperture $4^a$ that registers with the oil duct 10, said aperture being in communication with an annular groove 11 formed in the bushing, whereby oil is distributed to the face of the crank-shaft.

A channel 12, in the stud portion of the crank-shaft, communicates with the annular groove 11 of the bushing, the channel being arranged to extend through the body of disk 5 and crank pin 6, whereby oil is distributed to the bushing 7 and bearing surface of the pitman 8. The oil duct 10 and channel 12, thus form passages through which clean oil is distributed to the various journals of the crank shaft. Another oil duct 13 passes directly through seat 9 and communicates with the lower well portion of the crank case, through which duct the surplus oil is drawn by the pump mechanism, in a manner to be hereinafter described.

Secured to the seat 9, by suitable screws, is the flat face 14 of a pump housing 15, and, as best shown in Fig. 4, the flat face of said pump housing is provided with an oil duct $10^a$, which duct is adapted to communicate with the clean oil duct 10. Another duct $13^a$ formed in the flat face 14 of the pump housing is in register with the oil duct 13. The ducts $10^a$ and $13^a$ communicate with a cylindrical chamber 16 formed in the housing and directly under the oil duct $10^a$ is a duct $10^b$ which communicates with the chamber 16 and one end of a pump cylinder 17. A duct $10^c$ communicates with the chamber 16, directly below the mouth of the duct $10^b$, but is disposed at an angle of approximately 90° therefrom. The duct $10^c$ extends through a threaded nipple, to which nipple is coupled an oil supply pipe 18, that serves as a conductor for the distribution of clean oil to the crank shaft journals, through the medium of a rotary valve to be hereinafter described, the ducts 10ᵃ, 10ᵇ and 10ᶜ comprising a set.

The duct 13ᵃ forms one of a second set of oil passages which are utilized to return surplus oil from the crank casing well, the set comprising a duct 13ᵇ, which is located directly above the duct 13ᵃ and communicates with the outer end of the pump cylinder 17, as best shown in Fig. 4, and a duct 13ᶜ that leads from the chamber 16, completing the second series, the said last mentioned duct being disposed at an approximate angle of 90° from the ducts 13ᵃ, 13ᵇ. The duct 13ᶜ passes through a threaded nipple that extends from the housing 15 and to this nipple is coupled an oil return pipe 19 that conducts oil, after being used, back to a reservoir to be hereinafter described.

Revolubly mounted within the housing chamber 16 is a cylindrical valve-plug 20, which plug constitutes a rotary valve member that operates in conjunction with the various mouths of the oil ducts, communicating with said housing chamber. The valve-plug 20 is provided with an annular groove 21, which groove is in constant communication with the mouth of the duct 10ᵇ. The annular groove 21 is connected by a longitudinal groove 22 to semicircular grooves 21ᵃ, 21ᵇ, respectively, below and above the same. These semicircular grooves are staggered with relation to each other, in such manner that their respective terminals are approximately at angles of 90°, the lower groove 21ᵃ being adapted to communicate with the duct 10ᶜ, while the upper groove 21ᵇ is adapted to communicate with the mouth of the oil duct 10ᵃ. The second or oil return system of ducts, is controlled by an annular groove 23 formed in the plug, which groove is in constant communication with the duct 13ᵇ. This annular groove 23 is connected by a longitudinal groove 24 to semicircular grooves 23ᵃ and 23ᵇ, the said grooves being staggered with relation to each other, whereby their terminals are set at an angle of approximately 90°, the said grooves being in relatively the same positions as the semicircular grooves 21ᵃ and 21ᵇ of the first, or oil distributing series. The last series of grooves 23, 23ᵃ and 23ᵇ of the plug control the return supply of oil that is led back to the reservoir through pipe 19, the groove 23ᵃ being adapted to register with the mouth of the oil duct 13ᵃ, while the groove 23ᵇ is arranged to communicate with the oil duct 13ᶜ.

The head of the plug 20 is preferably cut to form a worm-wheel 25, which worm-wheel engages a worm 26 that is carried by or forms part of a spindle 27. The spindle 27 is journaled in suitable bearings provided in the pump housing and the inner end of said spindle extends through an aperture in the crank casing, at which point it carries a gear-wheel 28 that is adapted to mesh with a similar gear-wheel 29 secured to the stud portion of the crank-shaft 3. By this arrangement of gears, continuous rotatory motion is imparted to the valve plug from the crank-shaft at the required low speed.

Mounted in the pump cylinder 17 is a piston head 30 having a piston rod 31, which piston rod passes through and has sliding fit in a bearing aperture formed in the inner end of the pump cylinder, the inner end of said piston being secured to a block 32. The under side of this block is formed with a cross-groove 33, into which cross-groove is fitted a wrist-pin 34, the wrist-pin being eccentric to the axis of and carried by the valve-plug 20. The opposite ends of the valve chamber 16 are closed by suitable caps, as shown, as is also the outer end of the pump cylinder, and thus all the movable parts within the pump housing are tightly incased and adapted to operate smoothly in oil supplied from the reservoir.

Referring to the diagram view, Fig. 8, 35 indicates an oil reservoir to which the oil supply pipe 18 is directly connected and located within this reservoir is a perforated screen 36, around which is wound any suitable porous fabric, the device constituting a filter to which the oil return pipe 19 is connected, said pipe being provided with a sight feed device 37 for convenience of observation. When the lubricator system is used in connection with a motorcycle, the oil reservoir or tank is connected to the seat mast or any convenient part of the frame and connected by the pipes 18 and 19 to the pump housing, as shown in Fig. 1. In the diagram the valve-plug 20 is indicated by dotted lines with the various oil grooves shown in skeleton form in full lines, the pump piston being provided with a cross-head, which is operated by the wrist-pin that is adapted to play within the cross-head slot, the said cross-head being a diagrammatic representation of the block 32 that is clearly shown in Fig. 5.

In the operation of my system, the plug is rotated in the direction as indicated by the dotted line arrow in Fig. 8. The rotatory plug, as shown in this figure of the drawings, is in such position, with relation to the pump cylinder, that the piston has completed its forward stroke. Assuming the parts to be in this position, clean oil will pass from the reservoir through the supply pipe 18 and from thence through the duct 10ᶜ to a semicircular groove 21ᵃ and from this groove it passes up through the longitudinal groove 22 and around the annular groove 21 and also up through said cross-groove 22 to the semicircular groove 21ᵇ as shown. Owing to the fact that the last named groove 21ᵇ has just passed the oil duct 10ᵃ communication therewith is cut off and hence the oil which now fills all of the aforesaid grooves will enter the duct 10ᵇ and be discharged into the inner end of the pump cylinder. As the plug continues to rotate, it causes a backward movement of the piston head and the clean oil will thus fill the forward end of the cylinder. When the piston head has completed its back stroke, it will be observed that the end of the annular groove 21ᵃ has passed the communicating duct 10ᶜ, and thus cut off the supply from the oil reservoir. While the piston head is completing its back stroke, it displaces a volume of oil within the cylinder between the piston head and the rear end thereof. This oil has been previously drawn into the cylinder from the bottom of the crank casing by suction of the piston head in its forward stroke. When said oil is displaced, as clearly shown in the diagram, it will pass downward through duct 13ᵇ to the annular groove 23 of the plug and from thence it will be distributed to the semicircular grooves 23ᵃ and 23ᵇ by means of the longitudinal connecting groove 24.

In the position shown in the diagram the lower groove 23ᵇ has just formed a communication with the duct 13ᶜ, which duct is in pipe connection with the filter 36. Consequently the piston displaces the body of oil aforesaid during a half rotation of the plug, this oil being forced through the plug grooves and return pipe 19 to the filter. Upon the completion of the back stroke of the piston head, the semicircular groove 23ᵇ will have cut off its connection with the duct 13ᶜ and simultaneously with this action the semicircular groove 23ᵃ will make connection with duct 13ᵃ, which duct communicates with the bottom of the crank casing. Consequently, while the valve-plug 20, is making the next half revolution and drawing the piston-head forward, communication is made from the bottom of said casing through the plug grooves to the rear end of the pump cylinder and any oil contained in the casing above the level of the duct 13 will be drawn by suction into the rear end of the pump cylinder. Upon the forward stroke of the piston it is obvious that clean oil, which had previously been delivered to the forward end of the pump cylinder, will be forced out through the duct 10ᵇ and into the set of grooves 21, 21ᵃ, 21ᵇ and 22. Owing to the relative positions of the semicircular grooves 21ᵃ and 21ᵇ, as the plug starts to rotate to draw the piston forward the semicircular groove 21ᵇ will have made connections with the duct 10ᵃ, and the semicircular groove 21ᵃ at this time will have cut off its communication with duct 10ᶜ. Consequently upon the next half revolution of the plug the clean oil in the forward end of the pump cylinder will be forced out through duct 10ᵃ to the bearing-boss of the crank casing and from thence through the various oil ducts, to the parts desired to be lubricated. The excess oil forced to the journals will drain back into the bottom of the crank-casing and be taken up as previously described, filtered and delivered to the oil reservoir. Thus the oil is continually used until its lubricating qualities have been all utilized.

As shown in the illustrations, it will be observed that only such oil is left standing in the well portion of the crank-casing as may be below the suction duct 13 and thus the moving parts are all economically lubricated and gumming caused through overfeed or use of the oil in the well is dispensed with and all parts economically and efficiently oiled. Furthermore, attention is called to the fact that, owing to the two sets of oil grooves in the valve-plug and connection between said plug and pump piston, the same are capable of moving in unison, being synchronized in such manner that two complete and distinct pump-controlled oil circuits are formed, one for the dirty oil and one for the clean oil, all of the connections being obtained through the separate sets of cut-off grooves, whereby check-valves are dispensed with and the device is thus rendered absolutely positive in its operation and accident caused through clogging is thus avoided. It will also be observed that, owing to the pump piston area, that end of the cylinder which is utilized for pumping the clean oil to the bearings, is of less volume than the opposite end of the cylinder which is utilized for pumping the dirty oil, and hence the capacity of the pump for returning the oil to the reservoir is much greater than the capacity for pumping the clean oil to the bearings. By this arrangement of pump areas there is no liability to flood the crank casing or oil receiver well.

While I have shown the mechanism as arranged to keep the crank casing or an equivalent well practically clean of oil, it is obvious that in some instances, especially in connection with automobile oiling, that it is desirable to maintain a certain percentage of oil within the well or crank casing. In such instances the suction aperture 13ᶜ would be placed at a height with relation to the well consistent with depth of oil desired to be maintained, and this level would thereafter be positively held owing to the fact that the capacity of the return pumping system is greater than the capacity of the supply pumping system.

I claim:

1. In a lubricator system having an oil reservoir, a filter, and a pump mechanism; the combination of a housing, a rotatory plug seated within the housing, the plug and housing constituting valve members, two sets of oil grooves in one of the members, each set consisting of a circular and a semicircular transverse groove disposed upon different planes and connected by a longitudinal groove, an oil receiving and an oil discharge duct adapted to have alternate communication with the semicircular grooves of each set, the oil receiving duct of one set being in communication with the oil reservoir, and the oil discharge duct of the other set being in communication with the filter and oil reservoir, and an oil duct in constant communication with each circular groove and pump mechanism.

2. In a lubricator system, a double acting pump, a rotatory plug, a housing for the plug, the housing and plug constituting valve members, two sets of oil grooves in one of the members, each set consisting of a circular and a semicircular groove disposed upon different planes and connected by a longitudinal groove, an oil receiving and an oil discharge duct arranged to have alternate communication with the semicircular groove of each set, and an oil duct in constant communication with each circular groove and opposite ends of the pump cylinder.

3. In a lubricator system for engines having incased crank chafts comprising an oil reservoir, a filter in communication with the reservoir and a double acting pump mechanism, a housing, a rototary plug seated within the housing, an actuating gear connection between the pump and plug, two sets of transversely disposed oil grooves in the plug, each set consisting of a circular and a semicircular groove disposed upon different planes and connected by a longitudinal groove, an oil receiving and an oil discharge duct adapted to have alternate communication with the semicircular grooves of each set, the oil receiving duct of one set being in communication with the oil reservoir, and the oil discharge duct being in communication with the engine crank shaft, the oil receiving duct of the second set being in communication with the crank casing and the oil discharge duct being in communication with the filter, and an oil duct in constant communication with each circular groove and opposite ends of the pump cylinder.

4. In a lubricator system, a rotatory plug, a housing for the plug, two sets of transversely disposed oil grooves in the periphery of the rotatory plug, each set consisting of a circular and an approximately semicircular groove disposed upon different planes and connected by a longitudinal groove, an oil receiving and an oil discharge duct arranged to have alternate communication with the semicircular groove of each set, a pump cylinder, a piston head reciprocatively mounted within the cylinder, a piston extending from the head, a cross-grooved block carried by the piston, a crank pin extending from the plug for engagement with the cross-groove of the block, and an oil duct in constant communication with each circular groove and opposite end of the pump cylinder.

5. In an engine having a crank casing and its crank shaft revolubly mounted in bearings of the casing; the combination of a lubricator comprising a housing secured to the crank casing, a valve plug revolubly mounted within the housing, two sets of oil grooves transversely disposed about the periphery of the valve plug, each set consisting of a circular and a semicircular groove upon different planes and connected by a longitudinal groove, oil receiving and oil discharge ducts in the housing arranged to have alternate communication with the semicircular groove of each set, a worm-wheel carried by said valve plug, a worm extending through the housing and crank casing for engagement with the worm-wheel, a gear-wheel secured to the worm, a second gear-wheel secured to the engine crank shaft in mesh with the gear-wheel carried by the worm, a pump cylinder extending from the housing, a piston head mounted within the pump cylinder, a piston extending from the head through one end of the pump cylinder, a block having a cross-head carried by the piston, a crank pin extending from one end of the valve plug for engagement with the cross-groove of the head, and an oil duct in constant communication with each circular groove and opposite ends of the pump cylinder.

In testimony that I claim the foregoing I have hereunto set my hand at Milwaukee in the county of Milwaukee and State of Wisconsin in the presence of two witnesses.

WILLIAM S. HARLEY.

Witnesses:
MAY DOWNEY,
CASANAVE YOUNG.